(12) United States Patent
Kyono

(10) Patent No.: US 9,356,519 B2
(45) Date of Patent: May 31, 2016

(54) CURRENT BALANCE CIRCUIT OF RESONANT TYPE SWITCHING POWER-SUPPLY CIRCUIT

(71) Applicant: Sanken Electric Co., LTD., Niiza-shi, Saitama (JP)

(72) Inventor: Yoichi Kyono, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 115 days.

(21) Appl. No.: 14/178,446

(22) Filed: Feb. 12, 2014

(65) Prior Publication Data
US 2015/0229216 A1    Aug. 13, 2015

(51) Int. Cl.
*H02M 3/337* (2006.01)
*H02M 3/28* (2006.01)
*H02M 1/00* (2006.01)

(52) U.S. Cl.
CPC ............ *H02M 3/285* (2013.01); *H02M 3/3376* (2013.01); *H02M 2001/0048* (2013.01); *Y02B 70/1491* (2013.01)

(58) Field of Classification Search
CPC .................. H02M 2001/0058; H02M 3/3388; H02M 3/3353; H02M 3/33523; H02M 3/33553; H02M 3/33576; H02M 3/33592
See application file for complete search history.

(56) References Cited

U.S. PATENT DOCUMENTS

| | | | | |
|---|---|---|---|---|
| 2010/0328968 | A1* | 12/2010 | Adragna et al. | 363/21.02 |
| 2012/0262953 | A1* | 10/2012 | Jungreis et al. | 363/17 |
| 2013/0265804 | A1* | 10/2013 | Fu et al. | 363/17 |
| 2014/0009985 | A1* | 1/2014 | Figge et al. | 363/65 |
| 2014/0098574 | A1* | 4/2014 | Hara et al. | 363/21.02 |

FOREIGN PATENT DOCUMENTS

JP    2005-033956 A    2/2005

OTHER PUBLICATIONS

Figge, H.; Grote, T.; Froehleke, N.; Boecker, J.; Ide, P., "Paralleling of LLC resonant converters using frequency controlled current balancing," Power Electronics Specialists Conference, 2008. PESC 2008. IEEE , vol., no., pp. 1080-1085, Jun. 15-19, 2008.*

* cited by examiner

*Primary Examiner* — Harry Behm
*Assistant Examiner* — Peter Novak
(74) *Attorney, Agent, or Firm* — Banner & Witcoff, Ltd.

(57) ABSTRACT

Provided is a switching power-supply device capable of balancing a plurality of converter blocks operated in parallel. The switching power-supply device includes a first series circuit of first and second switching elements, a second series circuit of third and fourth switching elements, which circuits are connected in parallel with a power supply, and a control circuit that turns on-and-off the first and second switching elements, alternately, with an arbitrary frequency and turns on-and-off the third and fourth switching elements, alternately, with the same frequency as the arbitrary frequency. The control circuit controls a phase difference of switching signals of the first and second series circuits.

4 Claims, 8 Drawing Sheets

CURRENT BALANCE CIRCUIT OF RESONANT TYPE SWITCHING POWER-SUPPLY CIRCUIT

TECHNICAL FIELD

This disclosure relates to a switching power-supply device.

BACKGROUND ART

As a switching power-supply device capable of supplying relatively high power, a switching power-supply device that has a plurality of converter blocks and operates, in parallel, the converter blocks has been known.

Circuit constants of the converter blocks operated in parallel are typically the same. In this configuration, currents that flow through the respective converter blocks are the same, theoretically. However, actually, power that flows in the respective converter blocks are unbalanced due to non-uniformity of components configuring the circuits of the respective converter blocks.

Therefore, according to a switching power-supply device disclosed in JP-A-2005-33956, outputs of the respective converter blocks are smoothed by choke coils, and the choke coils are magnetically coupled to balance the powers flowing in the respective converter blocks.

SUMMARY

According to the switching power-supply device disclosed in JP-A-2005-33956, the choke coil is inserted in a power line, and thus conduction loss is caused by the choke coil. As the power handled by the switching power-supply device increases, the loss becomes significant.

This disclosure has been made keeping in mind the above situation, and an object of this disclosure is to provide a switching power-supply device capable of balancing a plurality of converter blocks that are operated in parallel, suppressing a loss and increasing power to be supplied.

A switching power-supply device of the disclosure includes a plurality of converter blocks each of which includes: a series resonance circuit comprising: a transformer having a primary coil and a secondary coil that is magnetically coupled with the primary coil; a first series circuit of a first switching element and a second switching element, a capacitor that is connected to one end of the second switching element, and the primary coil that is connected between the capacitor and the other end of the second switching element, and a rectification circuit connected to a secondary coil, wherein the first series circuit being connected in parallel with a direct-current power supply, a smoothing circuit to which the rectification circuit of each of the converter blocks is connected; a control unit that controls a switching operation of the first series circuit of alternately turning on-and-off the first switching element and the second switching element with dead time in which the first switching element and the second switching element are turned off, for each of the converter blocks; and a current detection unit that detects currents flowing in each of the converter blocks, wherein at least one of the converter blocks further comprises: a second series circuit of a third switching element and a fourth switching element connected to the direct-current power-supply; and a reactor that is connected between a connection point of the third switching element and the fourth switching element and a primary coil-side terminal of the capacitor, and wherein, for each of the converter blocks having the second series circuit and the reactor, the control unit: performs controlling of a switching operation of the second series circuit of turning on-and-off the third switching element and fourth switching element, alternately, with dead time in which the third and fourth switching elements are turned off, to be the same as a frequency of switching operation of the first series circuit; and controls a phase difference between the switching operation of the first series circuit and the switching operation of the second series circuit, based on a difference between current flowing in the converter block, which is detected by the current detection unit, and current flowing in another converter block.

According to the disclosure, it is possible to provide a switching power-supply device capable of balancing a plurality of converter blocks that are operated in parallel, suppressing a loss and increasing power to be supplied.

DETAILED DESCRIPTION OF ILLUSTRATIVE EMBODIMENTS

Hereinafter, illustrative embodiments of the disclosure will be described with reference to the drawings.

Figure 1:
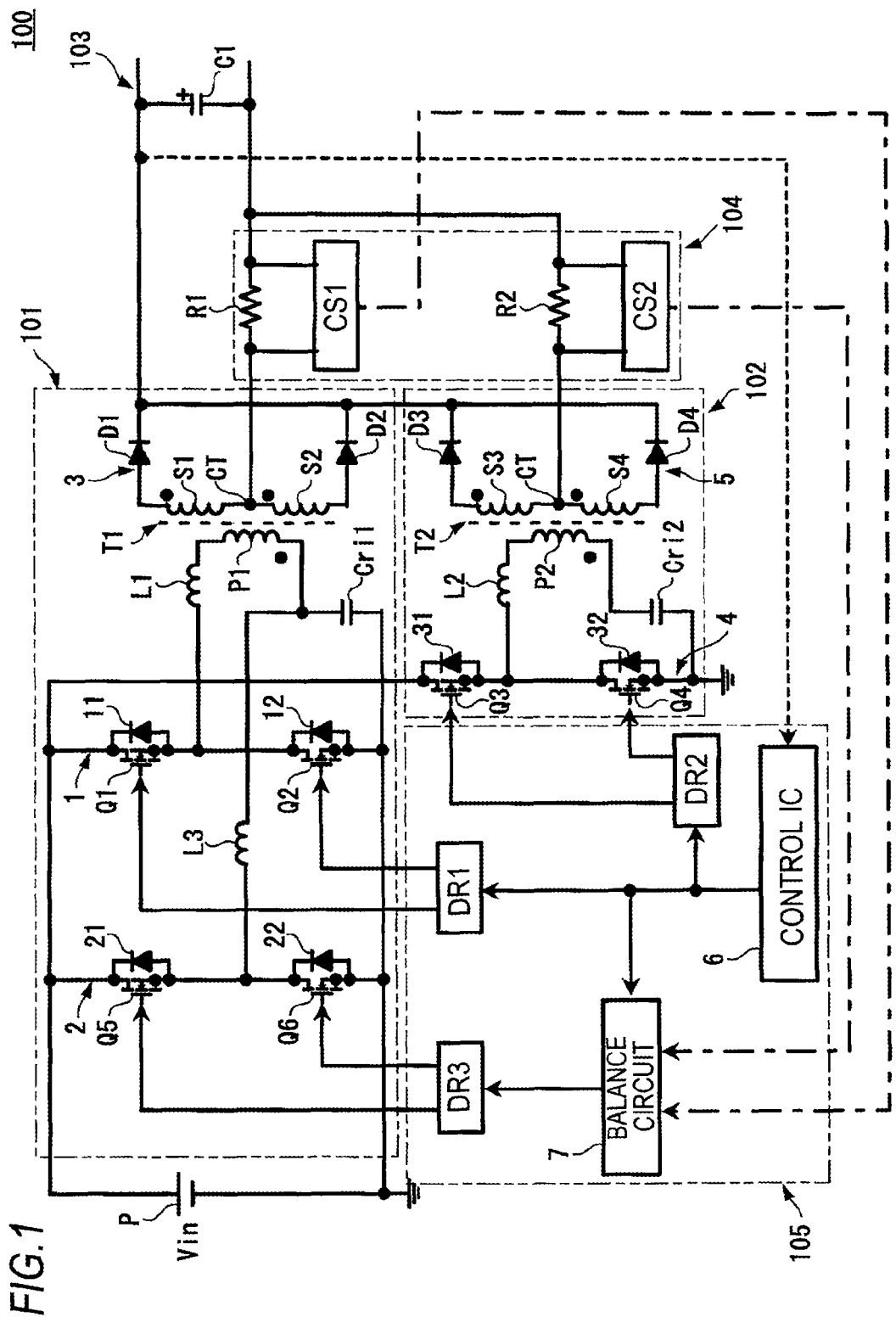
FIG. 1 is a circuit diagram illustrating a configuration of an example of a switching power-supply device for illustrating an illustrative embodiment of this disclosure.

FIG. 1 illustrates a configuration of an example of a switching power-supply device for illustrating an illustrative embodiment of this disclosure.

A switching power-supply device 100 has a first converter block 101 and a second converter block 102, which are connected in parallel with a direct-current power-supply P supplying a direct-current voltage Vin, which is obtained by rectifying and smoothing an alternating current voltage from a commercial power supply, for example, a smoothing circuit 103, a current detection unit 104 and a control unit 105.

The first converter block 101 has a first series circuit 1 and a second series circuit 2, which are connected in parallel with the direct-current power-supply P, reactors L1 and L3, a capacitor Cri1, a transformer T1 having a primary coil P1 and a secondary coil magnetically coupled with each other, and a rectification circuit 3.

In the shown example, the rectification circuit 3 is configured as a full wave rectification circuit, the transformer T1 has two secondary coils S1 and S2 that are connected to each other by a center-tap CT, and the rectification circuit 3 has two diodes D1 and D2. One end of the secondary coil S1 opposite to the center-tap CT is connected to the diode D1, and one end of the secondary coil S2 opposite to the center-tap CT is connected to the diode D2. In the meantime, the rectification circuit 3 may be configured as a half wave rectification circuit and the secondary coils of the transformer T1 and the diodes of the rectification circuit 3 may be configured as one secondary coil and one diode, respectively.

The first series circuit 1 includes a switching element Q1 (a MOSFET in the example of FIG. 1) configured by a semiconductor device that can be on-and-off-controlled, such as a MOSFET (Metal-Oxide-Semiconductor Field-Effect Transistor), an IGBT (Insulated Gate Bipolar Transistor), a thyristor and the like, a switching element Q2 (a MOSFET in the example of FIG. 1) that is connected in series with the switching element Q1, a diode 11 that is connected to both ends of the switching element Q1 and a diode 12 that is connected to both ends of the switching element Q2. The diode 11 may be a parasitic diode of the switching element Q1 and the diode 12 may be a parasitic diode of the switching element Q2.

In the first series circuit 1, both ends of the switching element Q2 is connected with a series circuit configured by the reactor L1, the primary coil P1 of the transformer T1 and the capacitor Cri1. The series circuit configured by the reactor L1, the primary coil P1 and the capacitor Cri1 configures a series resonance circuit that is connected in parallel with the switching element Q2. In the meantime, the reactor L1 may be a reactor having a leakage inductance of the primary coil P1.

The second series circuit 2 includes a switching element Q5 (a MOSFET in the example of FIG. 1), a switching element Q6 (a MOSFET in the example of FIG. 1) that is connected in series with the switching element Q5, a diode 21 that is connected to both ends of the switching element Q5 and a diode 22 that is connected to both ends of the switching element Q6. The diode 21 may be a parasitic diode of the switching element Q5 and the diode 22 may be a parasitic diode of the switching element Q6.

The reactor L3 is connected between a connection point of the switching element Q5 and switching element Q6 of the second series circuit 2 and a connection point of the capacitor Cri1 and primary coil P1 of the series resonance circuit. The series circuit configured by the reactor L3 and the capacitor Cri1 configures a resonance circuit that is connected in parallel with the switching element Q6.

The second converter block 102 has a first series circuit 4 that is connected to the direct-current power-supply P, a reactor L2, a capacitor Cri2, a transformer T2 and a rectification circuit 5.

The first series circuit 4 is configured to be the same as the first series circuit 1 of the first converter block 101, and includes a switching element Q3 (a MOSFET in the example of FIG. 1), a switching element Q4 (a MOSFET in the example of FIG. 1) that is connected in series with the switching element Q3, a diode 31 that is connected to both ends of the switching element Q3 and a diode 32 that is connected to both ends of the switching element Q4.

In the first series circuit 4, both ends of the switching element Q4 is connected with a series circuit configured by the reactor L2, a primary coil P2 of the transformer T2 and the capacitor Cri2. The series circuit configured by the reactor L2, the primary coil P2 and the capacitor Cri2 configures a series resonance circuit that is connected in parallel with the switching element Q4.

The rectification circuit 5 is configured to be the same as the rectification circuit 3 of the first converter block 101 and has two diodes D3 and D4. One end of a secondary coil S3 of the transformer T2 opposite to the center-tap CT is connected to the diode D3 and one end of a secondary coil C4 opposite to the center-tap CT is connected to the diode D4.

The smoothing circuit 103 combines respective outputs of the first converter block 101 and the second converter block 102 and smoothes. In the shown example, the smoothing circuit 103 has a capacitor C1, one end of the capacitor C1 is connected with the diodes D1 and D2 included in the rectification circuit 3 of the first converter block 101, and the diodes D3 and D4 included in the rectification circuit 5 of the second converter block 102 and the other end of the capacitor C1 is connected with the respective center-taps CT of the transformer T1 of the first converter block 101 and the transformer T2 of the second converter block 102.

The current detection unit 104 detects current that flows through each the first converter block 101 and second converter block 102. In the shown example, the current detection unit 104 has resistances R1 and R2 serving as current detection elements, a first current detection circuit CS1 and a second current detection circuit CS2. The resistance R1 is provided between the center-tap CT of the transformer T1 of the first converter block 101 and the capacitor C1 of the smoothing circuit 103, and the first current detection circuit CS1 detects current that flows through the secondary coils S1 and S2 of the transformer T1 of the first converter block 101, based on a voltage between terminals of the resistance R1. The resistance R2 is provided between the center-tap CT of the transformer T2 of the second converter block 102 and the capacitor C1 of the smoothing circuit 103, and the second current detection circuit CS2 detects current that flows through the secondary coils S3 and S4 of the transformer T2 of the second converter block 102, based on a voltage between terminals of the resistance R2.

Each the first current detection circuit CS1 and the second current detection circuit CS2 is configured as a peak hold circuit, the first current detection circuit CS1 maintains a peak value of the current flowing through the secondary coils S1 and S2 of the transformer T1 of the first converter block 101, and the second current detection circuit CS2 maintains a peak value of the current flowing through the secondary coils S3 and S4 of the transformer T2 of the second converter block 102. Each the first current detection circuit CS1 and the second current detection circuit CS2 outputs a signal corresponding to the peak values to the control unit 105. Although illustration is omitted, a signal is transmitted and received between the first current detection circuit CS1 and second current detection circuit CS2 and the control unit 105 by using a photo-coupler and the like, and an insulation state between the primary side and the secondary side of each the transformer T1 of the first converter block 101 and the transformer T2 of the second converter block 102 is maintained.

Additionally, instead of the resistances R1 and R2 serving as the current detection elements, a current transformer, a Hall sensor and the like may be also used. Since the resistances R1 and R2 are inserted in a power line, a loss is slightly caused. However, when the current transformer or Hall sensor is used, the loss can be reduced.

The control unit 105 performs operation control of the first converter block 101 and the second converter block 102. The control unit 105 has a control circuit (control IC) 6, drivers DR1 and DR2, DR3 and a balance circuit 7.

The control circuit 6 generates a clock signal of a predetermined frequency with a predetermined duty ratio (for example, 50%) and supplies the generated clock signal to the drivers DR1 and DR2. The driver DR1 generates gate signals for controlling gates of the switching elements Q1 and Q2 included in the first series circuit 1 of the first converter block 101, in accordance with the clock signal of the control circuit 6. The driver DR1 supplies the gate signals to the switching elements Q1 and Q2 and turns on-and-off the switching elements Q1 and Q2, alternately, with dead time so that the switching elements Q1 and Q2 are not tuned on at the same time. The driver DR2 also generates gate signals for controlling gates of the switching elements Q3 and Q4 included in the first series circuit 4 of the second converter block 102, in accordance with the clock signal of the control circuit 6. The driver DR2 supplies the gate signals to the switching elements Q3 and Q4 and turns on-and-off the switching elements Q3 and Q4, alternately, with dead time so that the switching elements Q3 and Q4 are not turned on at the same time.

The first series circuit 1 of the first converter block 101 and the first series circuit 4 of the second converter block 102 are controlled in accordance with the clock signals of the control circuit 6 and frequencies of switching operations thereof are the same. Also, in the shown example where the clock signal is directly supplied to the drivers DR1 and DR2 from the control circuit 6, the switching operation of the first series circuit 1 of the first converter block 101 is the same phase as the switching operation of the first series circuit 4 of the second converter block 102.

A voltage of the capacitor C1 of the smoothing circuit 103, which is an output voltage of the switching power-supply device 100, is fed back to the control circuit 6 by using the photo-coupler and the like, and the control circuit 6 changes a frequency of the clock signal based on an error between the target voltage and the output voltage, for example, so that a target voltage is stably output.

The clock signal is supplied to the balance circuit 7 from the control circuit 6, and the output signals of the first current detection circuit CS1 and the second current detection circuit CS2 of the current detection unit 104 is input to the balance circuit 7. The balance circuit 7 generates a clock signal for driving the driver DR3, based on the clock signal of the control circuit 6 and each the output signals of the first current detection circuit CS1 and second current detection circuit CS2, and supplies the generated clock signal to the driver DR3. The driver DR3 generates gate signals for controlling the gates of the switching elements Q5 and Q6 included in the second series circuit 2 of the first converter block 101, in accordance with the clock signal of the balance circuit 7. Then, the driver DR3 supplies the gate signals to the switching elements Q5 and Q6 and turns on-and-off the switching elements Q5 and Q6, alternately, with dead time so that the switching elements Q5 and Q6 are not turned on at the same time.

The clock signal of the balance circuit 7 is generated on the basis of the clock signal of the control circuit 6, and the frequency of the switching operation of the second series circuit 2 of the first converter block 101 which is controlled in accordance with the clock signal of the balance circuit 7 is the same as the frequency of the switching operation of the first series circuit 1 of the first converter block 101 which is controlled in accordance with the clock signal of the control circuit 6. A phase of the switching operation of the second series circuit 2 with respect to the switching operation of the first series circuit 1 is changed by the balance circuit 7. The balance circuit 7 controls the phase of the switching operation of the second series circuit 2 with respect to the switching operation of the first series circuit 1, thereby balancing the powers flowing in each the first converter block 101 and the second converter block 102.

Figure 2:
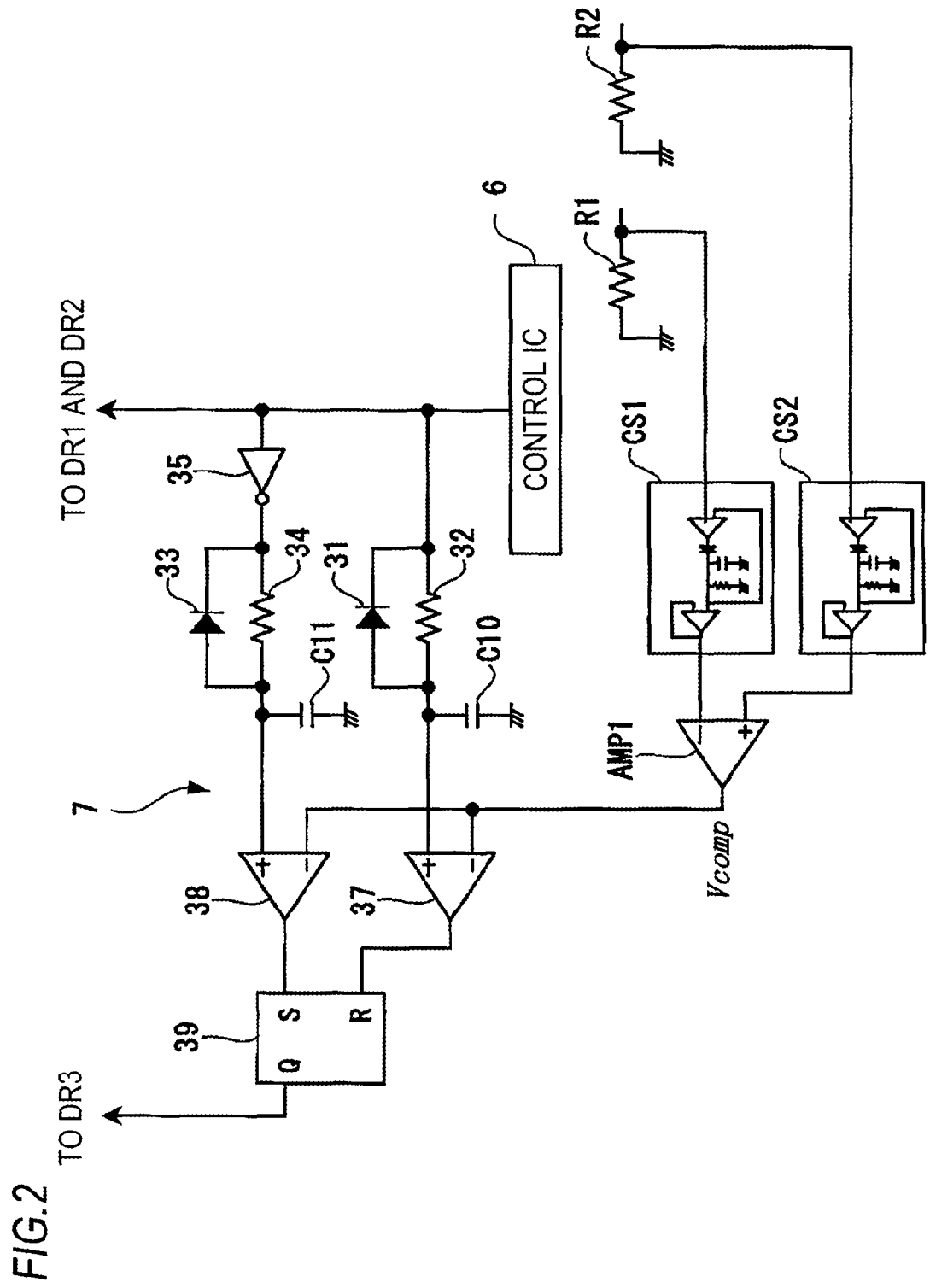
FIG. 2 is a circuit diagram illustrating a configuration of a control unit of the switching power supply shown in FIG. 1.

FIG. 2 illustrates an internal configuration of the balance circuit 7 of the control unit 105.

The balance circuit 7 has a first time-constant circuit including a diode 31, a resistance 32 and a capacitor C10, a second time-constant circuit including a diode 33, a resistance 34 and a capacitor C11, a NOT circuit 35, comparators 37 and 38, an RS flip-flop (RS-FF) 39 and an error amplifier AMP1.

Each the output signals of the first current detection circuit CS1 and the second current detection circuit CS2 are input to the error amplifier AMP1. The error amplifier AMP1 outputs a signal corresponding to a difference of the output signals of the first current detection circuit CS1 and the second current detection circuit CS2, i.e., a difference of the currents flowing through the first converter block 101 and the second converter block 102. The signal that is output from the error amplifier AMP1 is input to inverting input terminals of the comparators 37 and 38, as a reference voltage Vcomp.

The clock signal of the control circuit 6 is input to the first time-constant circuit and is also input to the second time-constant circuit through the NOT circuit 35. The first time-constant circuit is connected to a non-inverting input terminal of the comparator 37 and the second time-constant circuit is connected to a non-inverting input terminal of the comparator 38. The first time-constant circuit and the second time-constant circuit are set with the same circuit constant, and the non-inverting input terminals of the comparators 37 and 38 are respectively input with voltages that have the same time-constant at ascending and descending timings of the clock signal of the control circuit 6.

An output of the comparator 37 becomes a high level at a time when the voltage of the first time-constant circuit, which is input to the non-inverting input terminal, reaches the reference voltage Vcomp that is input to the inverting input terminal, and an output of the comparator 38 becomes a high level at a time when the voltage of the second time-constant circuit, which is input to the non-inverting input terminal, reaches the reference voltage Vcomp that is input to the inverting input terminal. The output of the comparator 37 is input to a reset terminal of the RS-FF 39 and the output of the comparator 38 is input to a set terminal of the RS-FF 39, respectively. An output signal of the RS-FF 39 is switched between a high level and a low level at respective ascending timings of the input to the reset terminal and the input to the set terminal and is supplied to the driver DR3, as a clock signal.

Additionally, the diode 31 of the first time-constant circuit is a diode for discharge to instantaneously pull out a voltage of the capacitor C10 when the input signal becomes a low level, and the diode 33 of the second time-constant circuit is a diode for discharge to instantaneously pull out a voltage of the capacitor C11 when the input signal becomes a low level.

Figure 3:
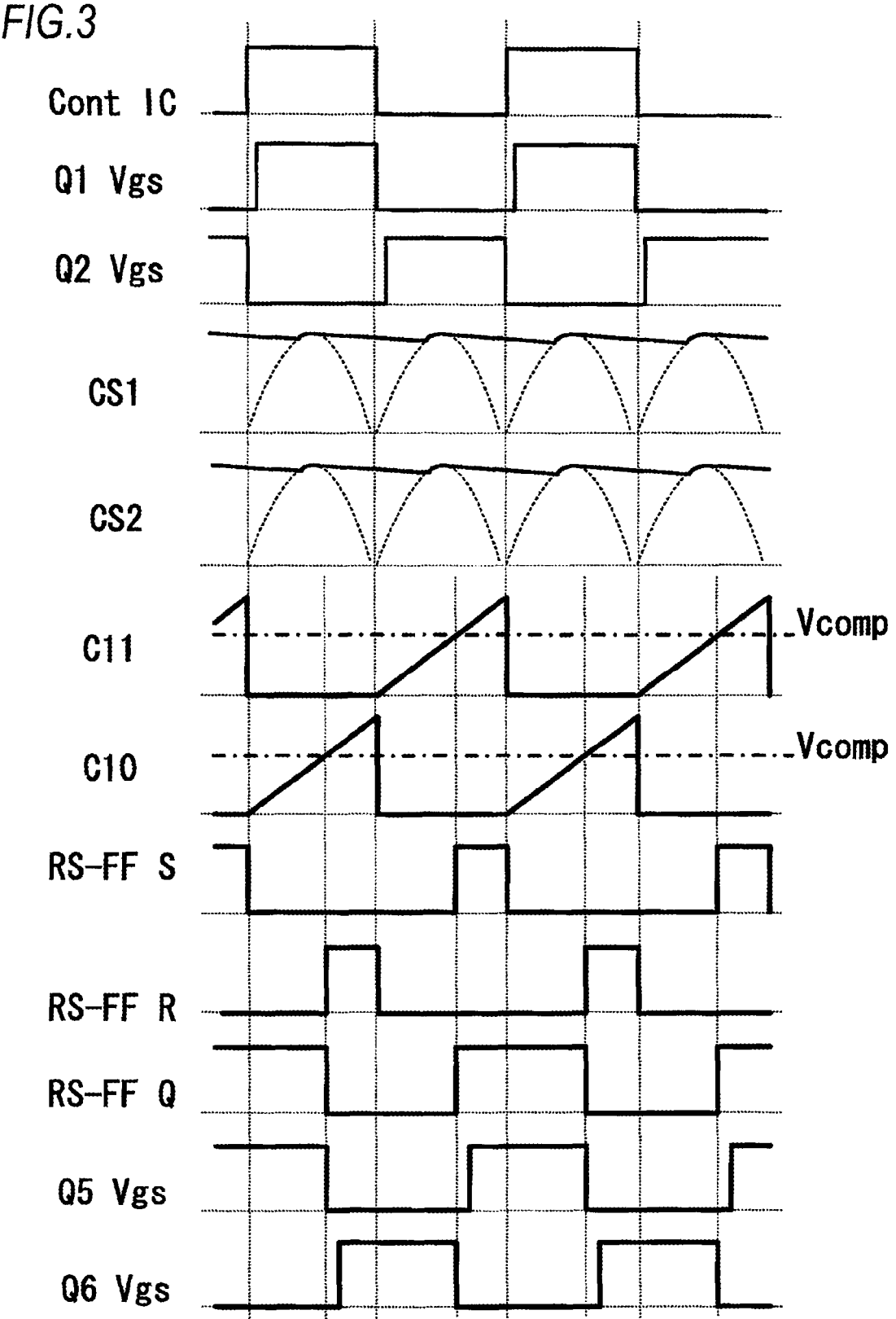
FIG. 3 illustrates an example of an operating waveform of the control unit of the switching power-supply device shown in FIG. 1.
Figure 4:
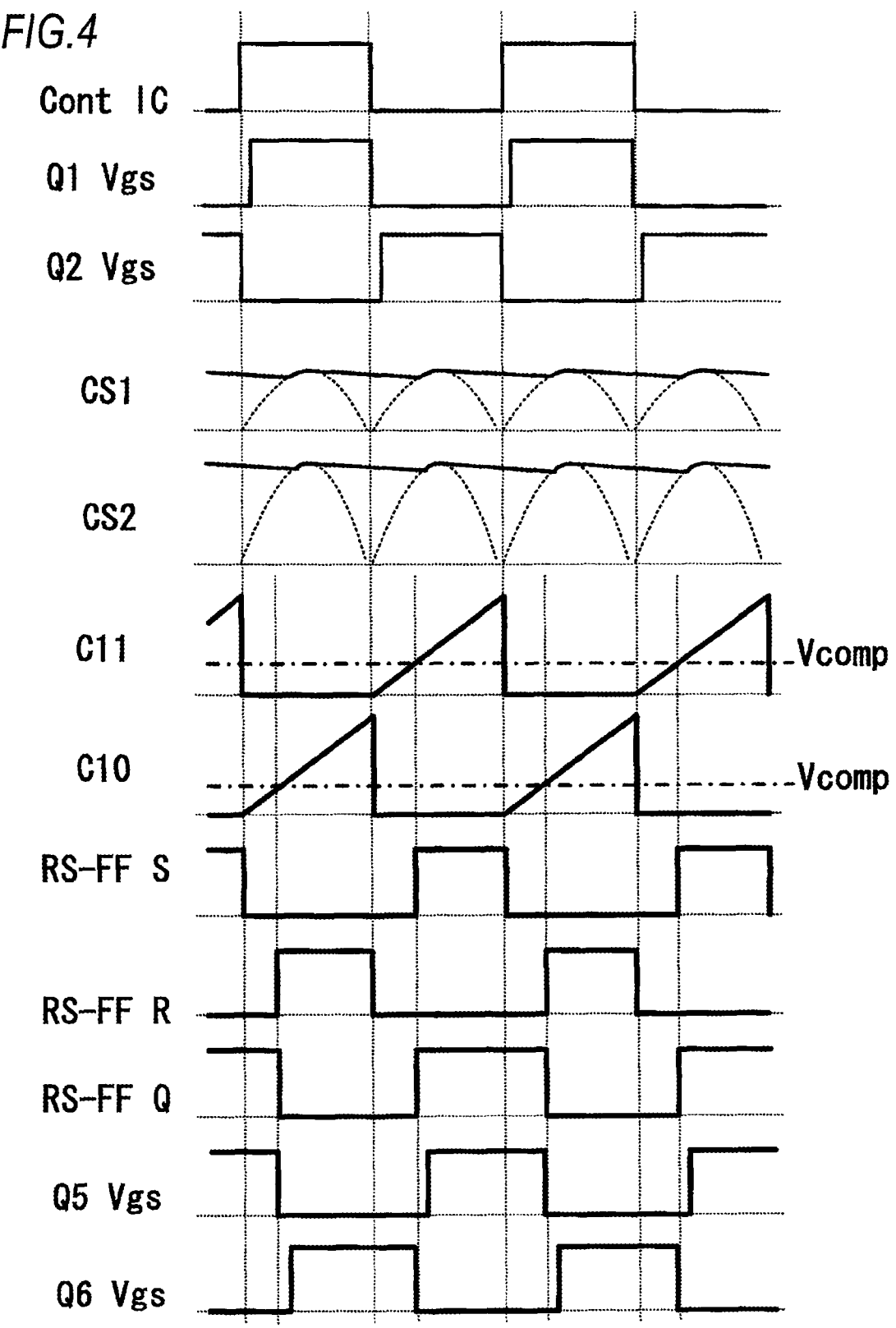
FIG. 4 illustrates an example of the operating waveform of the control unit of the switching power-supply device shown in FIG. 1.

FIGS. 3 and 4 illustrate examples of an operating waveform of the control unit 105.

In FIGS. 3 and 4, "Cont IC" indicates a waveform of the clock signal that is generated from the control circuit 6. "Q1 Vgs" indicates the gate signal that is supplied to the switching element Q1 of the first converter block 101 and "Q2 Vgs" indicates the gate signal that is supplied to the switching element Q2 of the first converter block 101. "CS1" indicates an output waveform of the first current detection circuit CS1 and "C52" indicates an output waveform of the second current detection circuit CS2. "C10" indicates a voltage waveform of the capacitor C10 and "C11" indicates a voltage waveform of the capacitor C11. "RS-FF S" indicates an input waveform of the set terminal of the RS-FF 39, "RS-FF R" indicates an input waveform of the reset terminal of the RS-FF 39, and "RS-FF Q" indicates an output waveform of the RS-FF 39. "Q5 Vgs" indicates the gate signal that is supplied to the switching element Q5 of the first converter block 101 and "Q6 Vgs" indicates the gate signal that is supplied to the switching element Q6 of the first converter block 101. Additionally, in this example where the first series circuit 1 of the first converter block 101 and the first series circuit 4 of the second converter block 102 are operated in the same phase, since the gate signals that are supplied to the switching elements Q3 and Q4 of the second converter block 102 are the same as the gate signals that are supplied to the switching elements Q1 and Q2 of the first converter block 101, illustrations are omitted.

The clock signal of the control circuit 6 alternately repeats turning on-and-off with a duty ratio of 50%. The driver DR1 generates the gate signals Q1 Vgs and Q2 Vgs, which alternately turn on-and-off with dead time of several 100 ns, from the clock signal, supplies the gate signal Q1 Vgs to the switching element Q1 of the first converter block 101 and supplies the gate signal Q2 Vgs to the switching element Q2 of the first converter block 101. The driver DR2 also generates the gate signals, which alternately turn on-and-off with dead time of several 100 ns, from the clock signal and supplies the same to the switching elements Q3 and Q4 of the second converter block 102.

When the clock signal of the control circuit 6 becomes a high level, the voltage of the capacitor C10 increases, and when the clock signal becomes a low level, the voltage of the capacitor C10 becomes zero. Also, when the clock signal of the control circuit 6 becomes a low level, the voltage of the capacitor C11 increases, and when the clock signal becomes a high level, the voltage of the capacitor C11 becomes zero.

The reset input of the RS-FF 39 becomes a high level for a time period in which the voltage of the capacitor C10 is the reference voltage Vcomp or higher, and the reset input of the RS-FF 39 becomes a low level for a time period in which the voltage of the capacitor C10 is lower than the reference voltage Vcomp. Also, the set input of the RS-FF 39 becomes a high level for a time period in which the voltage of the capacitor C11 is the reference voltage Vcomp or higher, and the set input of the RS-FF 39 becomes a low level for a time period in which the voltage of the capacitor C11 is lower than the reference voltage Vcomp.

The output signal of the RS-FF 39 is switched between the high level and the low level at respective ascending timings of the reset input and the set input and becomes a signal of which a phase is advanced with respect to the clock signal of the control circuit 6.

The driver DR3 generates the gate signals Q5 Vgs and Q6 Vgs, which alternately turn on-and-off with dead time of several 100 ns, from the output signal of the RS-FF 39, supplies the gate signal Q5 Vgs to the switching element Q5 of the first converter block 101 and supplies the gate signal Q6 Vgs to the switching element Q6 of the first converter block 101.

In the above operations, when unbalance is caused in the powers (currents) flowing in the first converter block 101 and the second converter block 102, the reference voltage Vcomp is changed and the phase of the output signal of the RS-FF 39 with respect to the clock signal of the control circuit 6 is changed, as shown in FIG. 4. Thereby, the phases of the gate signals Q5 Vgs and Q6 Vgs with respect to the gate signals Q1 Vgs and Q2 Vgs, i.e., the phase of the switching operation of the second series circuit 2 with respect to the switching operation of the first series circuit 1 of the first converter block 101 is also changed.

As described above, the balance circuit 7 controls the phase of the switching operation of the second series circuit 2 with respect to the switching operation of the first series circuit 1 of the first converter block 101, based on the difference of the respective currents flowing in the first converter block 101 and the second converter block 102.

Figure 5:
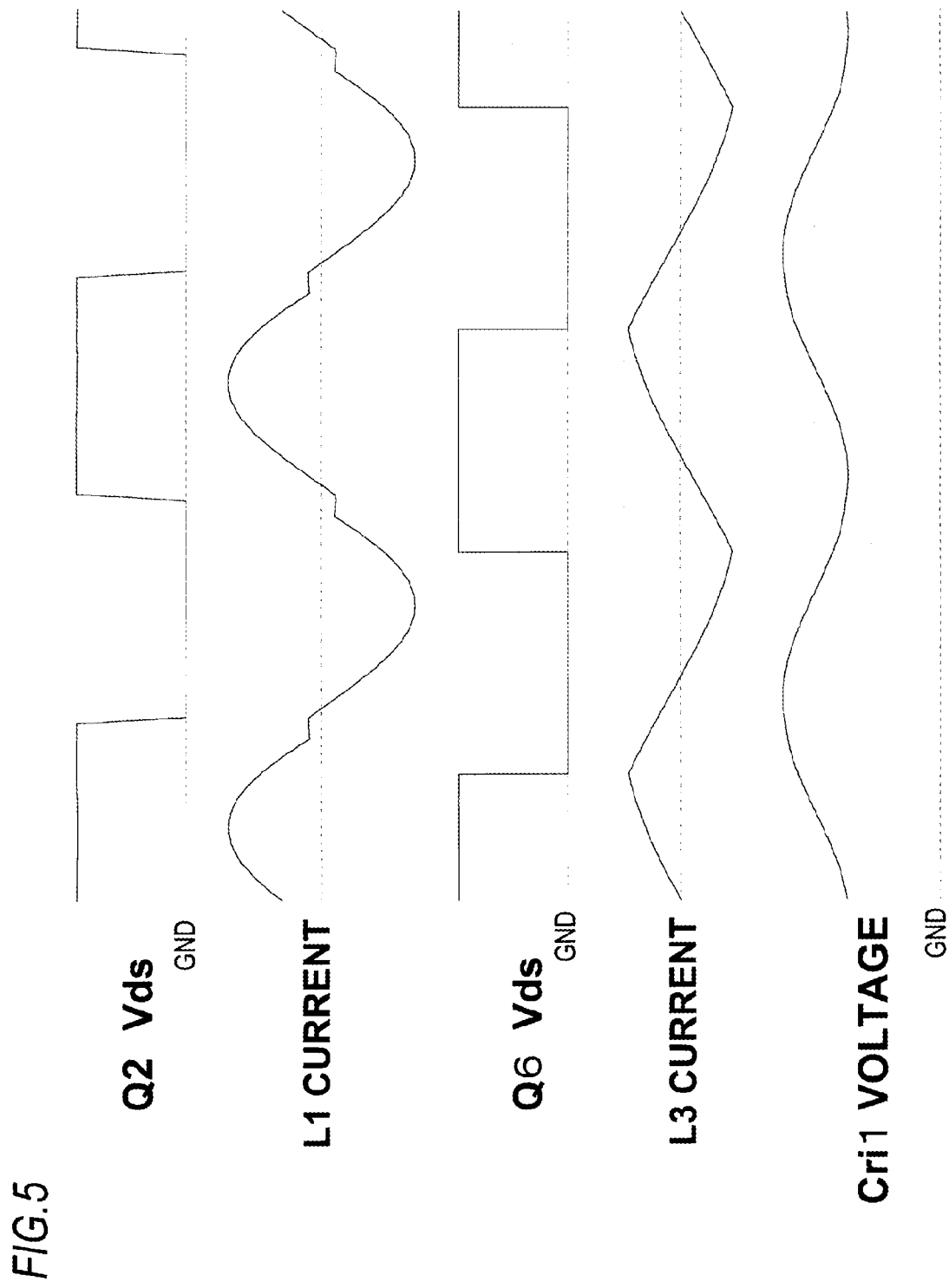
FIG. 5 illustrates an example of the operating waveform of the switching power-supply device shown in FIG. 1.

FIG. 5 illustrates an example of an operating waveform of the first converter block 101.

As the switching elements Q1 and Q2 of the first series circuit 1 of the first converter block 101 alternately turn on-and-off with the duty ratio of 50%, a positive-negative symmetric resonance current flows in the series resonance circuit configured by the reactor L1, the primary coil P1 and the capacitor Cri1. The resonance current has a shape where load current, which has a frequency determined by the reactor L1 and the capacitor Cri1 is to be discharged to a secondary side, overlaps with excitation current circulating in a primary side by a resonance operation of the reactor L1, the inductance of the primary coil P1 and the resonance capacitor Cri1.

Also, as the switching elements Q5 and Q6 of the second series circuit 2 of the first converter block 101 alternately turn on-and-off with the duty ratio of 50%, a positive-negative symmetric resonance current flows in the reactor L3 and the resonance current is combined with the resonance current of the reactor L1, and then it flows into the capacitor Cri1.

As the phase difference between the switching operation (the gate signals of the switching elements Q1 and Q2) of the first series circuit 1 and the switching operation (the gate signals of the switching elements Q5 and Q6) of the second series circuit 2 is changed, a phase difference between a current waveform flowing in the reactor L1 and a current waveform flowing in the reactor L3 is also changed. As a result, the resonance current flowing into the capacitor Cri1 is changed, so that a boosting amount of the capacitor Cri1 can be changed.

Figure 6:
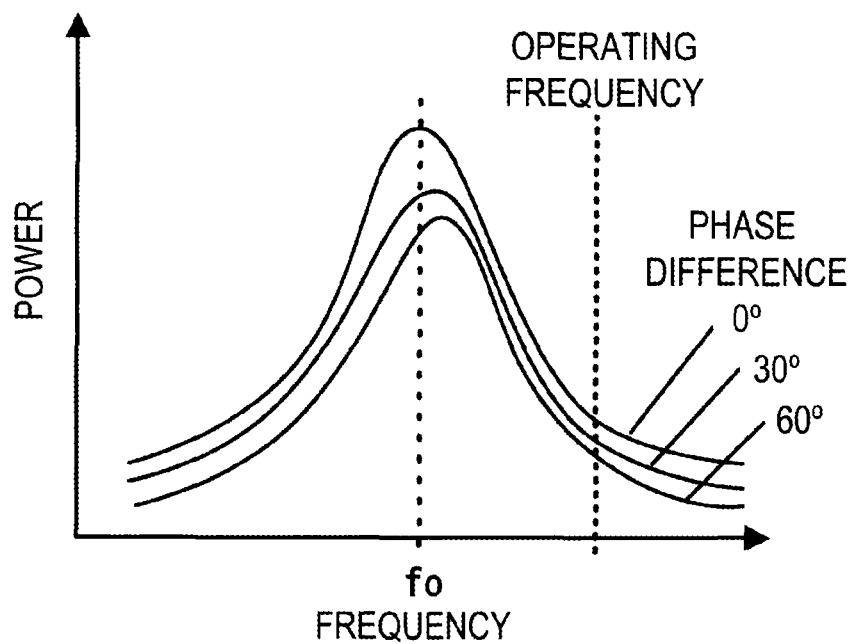
FIG. 6 illustrates a relation between a frequency of a switching operation of the switching power-supply device shown in FIG. 1 and power.
Figure 7:
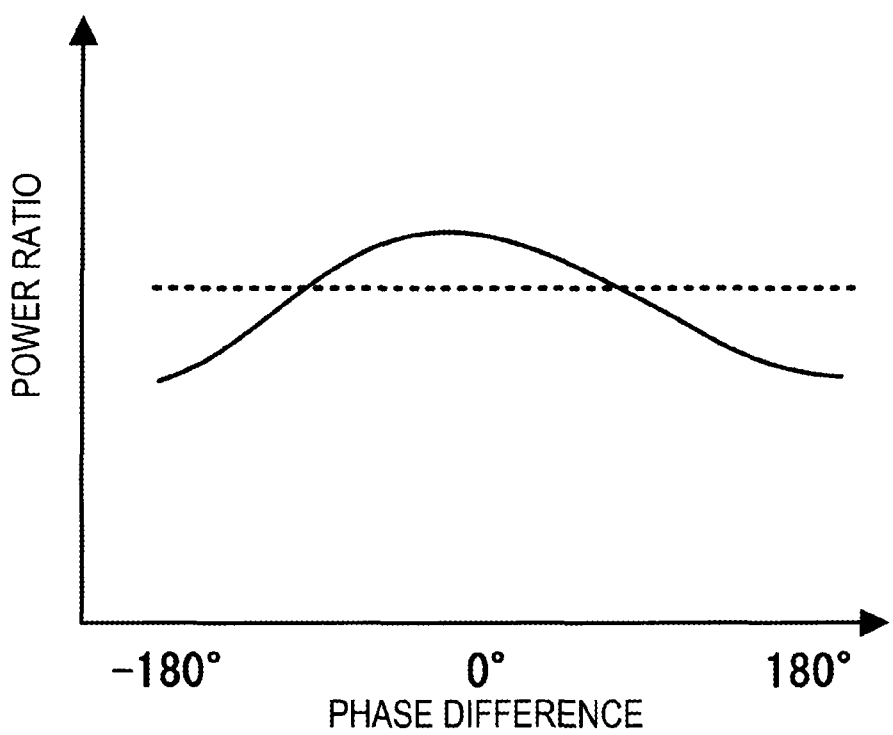
FIG. 7 illustrates a relation between a phase difference of switching operations of the switching power-supply device shown in FIG. 1 and the power.

FIG. 6 illustrates a relation between a frequency of the switching operation of the first series circuit 1 of the first converter block 101 and the power flowing in the first converter block 101. Also, FIG. 7 illustrates a relation between a phase difference of the switching operations of each the first series circuit 1 and the second series circuit 2 of the first converter block 101 and the power flowing in the first converter block 101. Additionally, in FIG. 7, a dotted line indicates the power flowing in the second converter block 102.

In FIG. 6, as the first series circuit 1 and the second series circuit 2 performs the switching operations with a frequency indicated by "operating frequency", since the phase difference of the switching operations of each the first series circuit 1 and the second series circuit 2 is changed, it is possible to control the power flowing in the first converter block 101. A relation between the phase difference and the power is shown in FIG. 7. A peak is set at a phase difference of about 0-degree, and the power is reduced as the phase difference (absolute value) is increased.

Here, when the power flowing in the first converter block 101 is larger than the power flowing in the second converter block 102, the phase difference of the switching operations of each the first series circuit 1 and second series circuit 2 is made to be large, and when the power flowing in the first converter block 101 is smaller than the power flowing in the second converter block 102, the phase difference of the switching operations of each the first series circuit 1 and the second series circuit 2 is made to be small. Thereby, it is possible to balance the powers flowing in the first converter block 101 and the second converter block 102. Therefore, it is preferable to configure the error amplifier AMP1 of the balance circuit 7 so that a change in the reference voltage Vcomp based on the difference of the currents flowing in the first converter block 101 and the second converter block 102 corresponds to the above change in the phase difference of the switching operations of the first series circuit 1 and the second series circuit 2.

In the example of the operating waveform shown in FIG. 3, the phase of the switching operation of the second series circuit 2 is advanced with respect to the switching operation of the first series circuit 1. It would be preferable that, when the power flowing in the first converter block 101 is larger than the power flowing in the second converter block 102, the phase of the switching operation of the second series circuit 2 is advanced with respect to the switching operation of the first series circuit 1, and it would be preferable that, when the power flowing in the first converter block 101 is smaller than the power flowing in the second converter block 102, the phase of the switching operation of the second series circuit 2 is delayed with respect to the switching operation of the first series circuit 1.

Meanwhile, in the example of the operating waveform shown in FIG. 3, the phase of the switching operation of the second series circuit 2 is advanced with respect to the switching operation of the first series circuit 1. However, the balance circuit 7 may be configured so that the phase of the switching operation of the second series circuit 2 is delayed with respect to the switching operation of the first series circuit 1, and it would be preferable that, when the power flowing in the first converter block 101 is larger than the power flowing in the second converter block 102, the phase of the switching operation of the second series circuit 2 is delayed with respect to the switching operation of the first series circuit 1, and it would be preferable that when the power flowing in the first converter block 101 is smaller than the power flowing in the second converter block 102, the phase of the switching operation of the second series circuit 2 is advanced with respect to the switching operation of the first series circuit 1.

As described above, according to the switching power-supply device 100, by controlling the phase difference of the switching operations of the first series circuit 1 and the second series circuit 2 of the first converter block 101, it is possible to balance each of the powers flowing in the first converter block 101 and the second converter block 102 and to suppress the loss, as compared to a configuration where the power line is provided with the impedance such as a choke coil.

Figure 8:
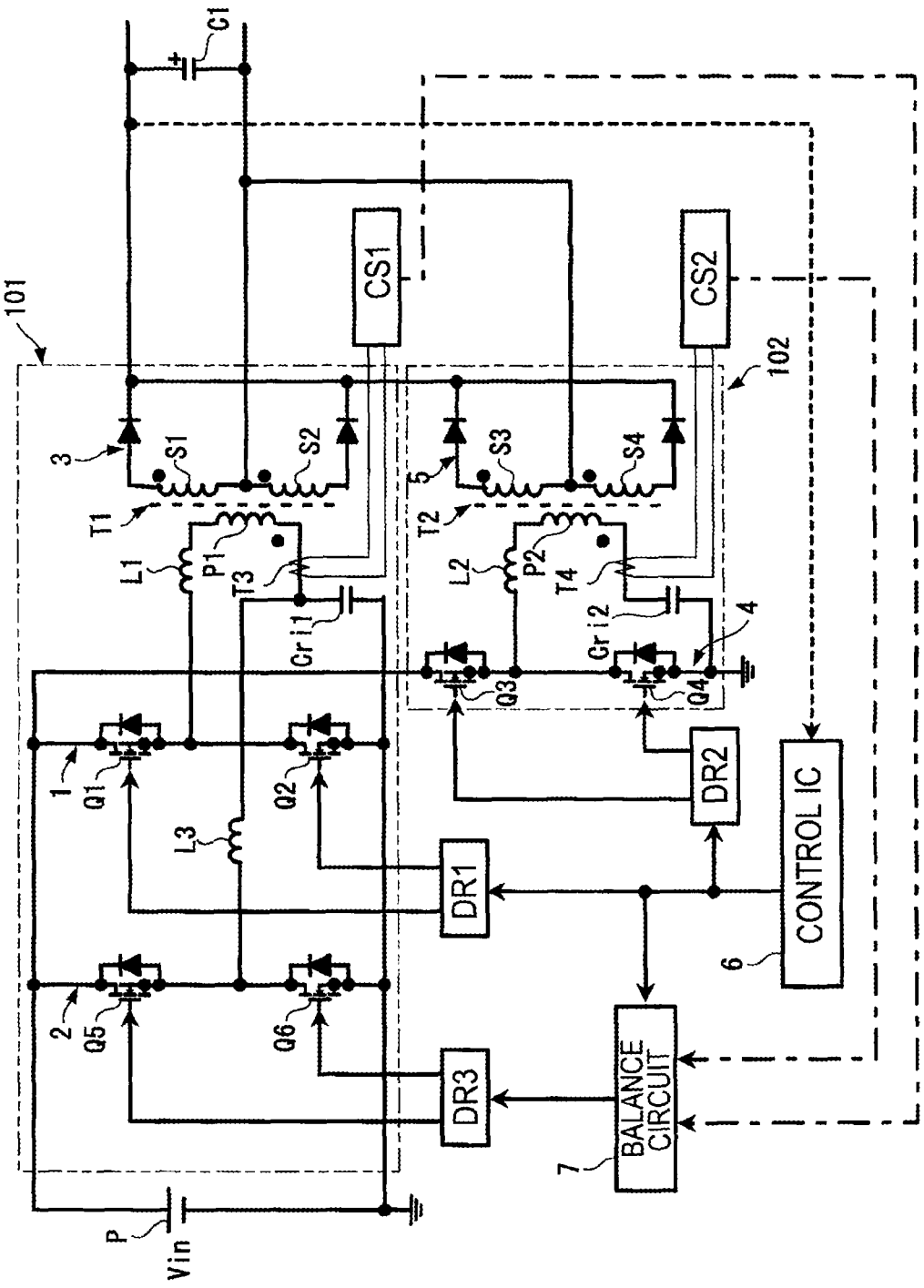
FIG. 8 illustrates a configuration of a modified embodiment of the switching power-supply device shown in FIG. 1.

FIG. 8 illustrates a configuration of a modified embodiment of the switching power-supply device 100. In FIG. 8, the same configurations as those of FIG. 1 are denoted with the same reference numerals.

In an example shown in FIG. 8, a current transformer T3 serving as the current detection element is provided between the capacitor Cri1 and the primary coil P1 of the first converter block 101, a current transformer T4 serving as the current detection element is provided between the capacitor Cri2 and the primary coil P2 of the second converter block 102, and the resonance currents flowing through the primary sides of the transformers T1 and T2 are detected as the currents flowing through the first converter block 101 and the second converter block 102. Even in this configuration, it is possible to obtain the same effects as the switching power-supply device 100.

Figure 9:
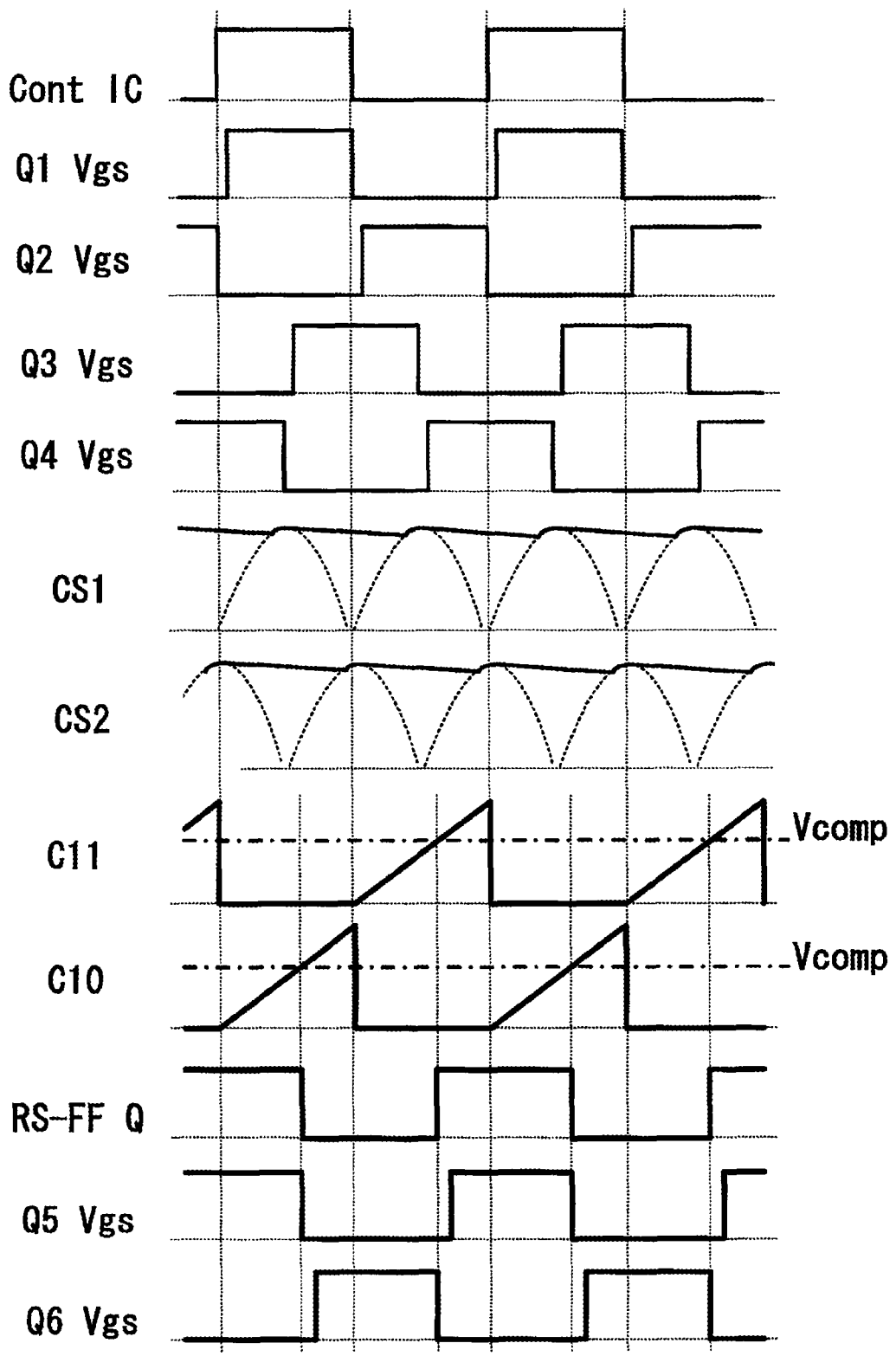
FIG. 9 illustrates an example of an operating waveform of a control unit of another modified embodiment of the switching power-supply device shown in FIG. 1.

FIG. 9 illustrates an example of an operating waveform of a control unit of another modified embodiment of the switching power-supply device 100.

In an example shown in FIG. 9, a phase difference is applied to the switching operation (the gate signals of the switching elements Q1 and Q2) of the first series circuit 1 of the first converter block 101 and the switching operation (the gate signals of the switching elements Q3 and Q4) of the first series circuit 4 of the second converter block 102. The phase difference can be applied by an appropriate delay circuit that is provided between the control circuit 6 and the driver DR2, for example. In the shown example, a phase difference of about 90-degree is applied. Even in this configuration, it is possible to obtain the same effects as the switching power-supply device 100. Also, it is possible to reduce a ripple of the current flowing through the smoothing circuit 103.

Although the example where the second series circuit 2 for balancing the powers flowing in the first converter block 101 and the second converter block 102, which are operated in parallel, is provided only for the first converter block 101 has been described, the second series circuit that is configured to be the same as the second series circuit 2 of the first converter block 101 may be also provided for the second converter block 102.

Also, three or more converter blocks can be operated in parallel, and in such case, the second series circuit that is configured to be the same as the second series circuit 2 of the first converter block 101 is provided for at least one converter block, so that it is possible to balance the power flowing in the converter block having the second series circuit in correspondence with the power flowing in the other converter blocks and to obtain the same effects as the switching power-supply device 100.

Although this disclosure has been descried with reference to the illustrative embodiments, the illustrative embodiments are just exemplary and can be changed and implemented without departing from the scope of this disclosure.

DESCRIPTION OF REFERENCE NUMERALS

100: switching power-supply device
101: first converter block
102: second converter block
103: smoothing circuit
104: current detection unit
105: control unit
1, 4: first series circuit
2: second series circuit
P: direct-current power supply
L1, L2, L3: reactor
T1, T2: transformer
T3, T4: current transformer
P1, P2: primary coil
S1 and S2, S3 and S4: secondary coil
Q1 to Q6: switching element
DR1 and DR2, DR3: driver
Cri1, Cri2: capacitor
D1 and D2, 11, 12, 21, 22: diode

What is claimed is:
1. A switching power-supply device comprising:
a plurality of converter blocks connected in parallel and each of which includes:
a series resonance circuit comprising: a transformer having a primary coil and a secondary coil that is magnetically coupled with the primary coil; a first series circuit including a first switching element and a second switching element, a capacitor that is connected to one end of the second switching element, and the primary coil that is connected between the capacitor and an other end of the second switching element, and
a rectification circuit connected to a secondary coil,
wherein the first series circuit being connected in parallel with a direct-current power supply,
a smoothing circuit to which the rectification circuit of each of the converter blocks is connected;

a control unit that controls a switching operation of the first series circuit of alternately turning on-and-off the first switching element and the second switching element with dead time in which the first switching element and the second switching element are turned off, for each of the converter blocks; and a current detection unit that detects currents flowing in each of the converter blocks, wherein at least one of the converter blocks further comprises: a second series circuit including a third switching element and a fourth switching element connected to the direct-current power supply; and a reactor that is connected between a connection point of the third switching element and the fourth switching element and a primary coil-side terminal of the capacitor, and wherein, for each of the converter blocks having the second series circuit and the reactor, the control unit:

performs controlling of a switching operation of the second series circuit of turning on-and-off the third switching element and the fourth switching element, alternately, with dead time in which the third switching element and the fourth switching element are turned off, to a frequency of switching operation of the first series circuit; and controls a phase difference between the switching operation of the first series circuit and the switching operation of the second series circuit, based on a difference between current flowing in the converter block, which is detected by the current detection unit, and current flowing in another converter block, so that a voltage of the capacitor is adjusted to adjust the current flowing in respective converter blocks, wherein, for each of the converter blocks having the second series circuit and the reactor, the control unit:

increases the phase difference between the switching operation of the first series circuit and the switching operation of the second series circuit when the current flowing in the converter block, which is detected by the current detection unit, is larger than the current flowing in another converter block; and decreases the phase difference between the switching operation of the first series circuit and the switching operation of the second series circuit when the current flowing in the converter block, which is detected by the current detection unit, is smaller than the current flowing in another converter block.

2. The switching power-supply device according to claim 1, wherein the current detection unit detects current that flows through the secondary coil of the transformer of each of the converter blocks.

3. The switching power-supply device according to claim 1, wherein the current detection unit detects current that flows through the primary coil of the transformer of each of the converter blocks.

4. The switching power-supply device according to claim 1, wherein the control unit make the first series circuits of each of the converter blocks perform a switching operation with different phases.

* * * * *